United States Patent
Cullen

(10) Patent No.: US 6,834,479 B2
(45) Date of Patent: Dec. 28, 2004

(54) BAGGING MACHINE HAVING A COLLAPSIBLE TUNNEL

(75) Inventor: Steven R. Cullen, Astoria, OR (US)

(73) Assignee: SRC Innovations, LLC, Astoria, OR (US)

( * ) Notice: Subject to any disclaimer, the term of this patent is extended or adjusted under 35 U.S.C. 154(b) by 80 days.

(21) Appl. No.: 10/350,680

(22) Filed: Jan. 23, 2003

(65) Prior Publication Data

US 2004/0065060 A1 Apr. 8, 2004

Related U.S. Application Data

(63) Continuation-in-part of application No. 10/264,161, filed on Oct. 3, 2002.

(51) Int. Cl.⁷ ................................................ B65B 1/24
(52) U.S. Cl. .............................. 53/530; 53/567; 141/74
(58) Field of Search ........................ 53/527, 530, 529, 53/567, 570, 574, 576

(56) References Cited

U.S. PATENT DOCUMENTS

| | | | |
|---|---|---|---|
| 3,638,394 A | * | 2/1972 | Winokur ...................... 53/255 |
| 3,687,061 A | | 8/1972 | Eggenmuller et al. ........ 100/65 |
| 3,968,619 A | * | 7/1976 | Fishburne .................... 53/399 |
| 4,046,068 A | | 9/1977 | Eggenmuller et al. ........ 100/65 |
| 5,140,802 A | | 8/1992 | Inman et al. ................. 53/459 |
| 5,191,758 A | * | 3/1993 | Cote ............................. 56/329 |
| 5,205,107 A | * | 4/1993 | Herink ......................... 53/255 |
| 5,295,554 A | | 3/1994 | Cullen |
| 5,297,377 A | | 3/1994 | Cullen |
| 5,313,768 A | | 5/1994 | Cullen |
| 5,316,060 A | * | 5/1994 | Hodgdon et al. ........... 141/390 |
| 5,345,744 A | | 9/1994 | Cullen |
| 5,355,659 A | | 10/1994 | Cullen |
| 5,367,860 A | | 11/1994 | Cullen |
| 5,396,753 A | | 3/1995 | Cullen |
| 5,398,736 A | | 3/1995 | Cullen |
| 5,408,809 A | | 4/1995 | Cullen |
| 5,408,810 A | * | 4/1995 | Cullen ......................... 53/567 |
| 5,419,102 A | * | 5/1995 | Inman et al. ................. 53/567 |
| 5,421,142 A | | 6/1995 | Cullen |
| 5,425,220 A | | 6/1995 | Cullen |
| 5,426,910 A | | 6/1995 | Cullen |
| 5,452,562 A | | 9/1995 | Cullen |
| 5,463,849 A | | 11/1995 | Cullen |
| 5,464,049 A | | 11/1995 | Cullen |
| 5,517,806 A | | 5/1996 | Cullen |
| 5,671,594 A | | 9/1997 | Cullen |
| 5,724,793 A | | 3/1998 | Inman et al. ................. 53/576 |
| 5,775,069 A | | 7/1998 | Cullen |
| 5,784,865 A | | 7/1998 | Cullen |
| 5,799,472 A | | 9/1998 | Cullen |
| 5,857,313 A | | 1/1999 | Cullen |
| 5,894,713 A | | 4/1999 | Cullen |
| 5,899,247 A | | 5/1999 | Cullen |
| 5,904,031 A | | 5/1999 | Cullen |
| 5,960,612 A | | 10/1999 | Cullen |
| 6,009,692 A | | 1/2000 | Cullen |
| 6,220,001 B1 | * | 4/2001 | Brodrecht .................... 53/567 |

* cited by examiner

*Primary Examiner*—Eugene Kim
*Assistant Examiner*—Paul Durand
(74) *Attorney, Agent, or Firm*—Kolisch Hartwell, P.C.

(57) ABSTRACT

A material bagging machine comprising a mobile frame having a collapsible tunnel positioned at the rearward end thereof. The tunnel may be positioned in its operative position for bagging purposes but may be collapsed to reduce the width thereof for transport purposes.

14 Claims, 5 Drawing Sheets

BAGGING MACHINE HAVING A COLLAPSIBLE TUNNEL

CROSS-REFERENCE TO RELATED APPLICATION

This is a continuation-in-part application of Petitioner's earlier application Ser. No. 10/264,161 filed Oct. 3, 2002, entitled A BAGGING MACHINE HAVING A COLLAPSIBLE TUNNEL.

BACKGROUND OF THE INVENTION

1. Field of the Invention

This invention relates to a bagging machine for bagging organic and other materials such as silage, compost, grain, sawdust, dirt, sand, etc., wherein the tunnel or material forming means of the bagging machine may be collapsed to reduce the width thereof for transport or shipping purposes.

2. Description of the Related Art

Agricultural feed bagging machines have been employed for several years to pack or bag silage or the like into elongated plastic bags. In recent years, the bagging machines have also been used to pack or back compost material and grain into the elongated plastic bags. Two of the earliest bagging machines are disclosed in U.S. Pat. Nos. 3,687,061 and 4,046,068. In the prior art bagging machines, silage or the like is supplied to the forward or intake end of the bagging machine and is fed to a rotor or other compression means which conveys the silage into a tunnel on which the bag is positioned so that the bag is filled. Applicant has received several patents directed to agricultural feed bagging machines, for example, U.S. Pat. Nos. 5,295,554; 5,297,377; 5,355,659; 5,367,860; 5,396,753; 5,398,736; 5,408,809; 5,408,810; 5,421,142; 5,425,220; 5,463,849; 5,464,049; 5,517,806; 5,671,594; 5,775,069; 5,784,865; 5,799,472; 5,857,313; 5,894,713; 5,899,247; 5,904,031; 5,960,612; and 6,009,692.

Over a period of time, the size of the bagging machines has dramatically increased with the tunnels thereof being of a width sufficient to accommodate bags having a 12-foot diameter. The large width of the tunnel presents a problem when the bagging machine is being transported on public roads which normally limit those widths to approximately 102 inches. Such width restrictions greatly reduce the mobility of the larger machines. The large width of the tunnel also presents a problem when the machines are being shipped, especially overseas.

Applicant is aware of U.S. Pat. No. 5,419,102 which issued on May 30, 1995. Although the '102 patent mentions that the tunnel width may be reduced for transporting the bagging machine from one location to another, primarily for overseas shipment, it is not believed that the '102 patent teaches a convenient means for reducing the tunnel width since the '102 patent apparently requires that the wheels somehow be raised up beneath the machine to reduce the width between the wheels of the machine. Further, the '102 patent lacks a convenient means for reducing the width of the tunnel. Additionally, the machine of the '102 patent is quite different than the machine described herein. Moreover, the machine disclosed in the '102 patent lacks adequate means for structurally resisting the outward forces applied to the tunnel components by the packed material therein. Further, in the '102 patent machine, the auger which conveys the material rearwardly slants up from the front of the machine towards the rear of the machine which places the rearward end of the conveyor auger high in the tunnel.

Additionally, some of the collapsible tunnels of the prior art require two or more hinges which are incorporated in the structure so that the tunnel or material forming means may be collapsed. The need for more than a single hinge point results in additional materials, fabrication, etc.

Manufacturers of plastic bags for use with agricultural bagging machines do not have an exact standard for overall (diameter) dimensions, and sizes can vary +/−10%. Also, the elasticity (or strength per allowable stretch tolerance) varies among manufacturers, some allowing more stretch than others. Such variances result in the inability to fill the bags to the fullest with all types of materials, densities, fiber lengths, etc., with the proper tension/stress on the bag skin.

SUMMARY OF THE INVENTION

A bagging machine for bagging organic and other materials such as silage, compost, grain, sawdust, dirt, sand, etc. into a flexible plastic bag having a closed end and an open mouth with the mouth of the bag being positioned on a tunnel or material forming means which directs the material from a material compression or packing means such as a rotor, packing fingers, packing plate, or screw conveyor into the open mouth of the bag. The tunnel is comprised of first and second tunnel members or "halves" which are hingedly connected together at their forward ends to enable the tunnel members to be moved between an operative open position to a collapsed position so that the machine will have a reduced overall width such that it may be easily transported from one location to another in its normal directional attitude or for shipment purposes.

It is therefore a principal object of the invention to provide a bagging machine for use in bagging organic or other material into a bag with the tunnel on the machine being selectively collapsible to reduce the width thereof for transport purposes.

A further object of the invention is to provide a bagging machine for use in bagging organic or other material into a bag with the tunnel on the machine being selectively collapsible to reduce the width thereof to facilitate the installation of a folded bag thereon.

A further object of the invention is to provide a machine of the type described wherein the tunnel thereof is comprised of first and second tunnel members or halves which are hingedly connected together at their forward ends.

Still another object of the invention is to provide a collapsible tunnel for an agricultural feed bagging machine.

Yet another object of the invention is to provide a collapsible tunnel for a machine for bagging organic material such as grain, compost or silage or other material such as sand, dirt, etc.

Still another object of the invention is to provide a collapsible tunnel wherein the tunnel thereof is comprised of first and second tunnel members or halves which are hingedly connected together at their forward ends with a single hinge point.

These and other objects of the invention will be apparent to those skilled in the art.

DESCRIPTION OF THE PREFERRED EMBODIMENT

Figure 1:
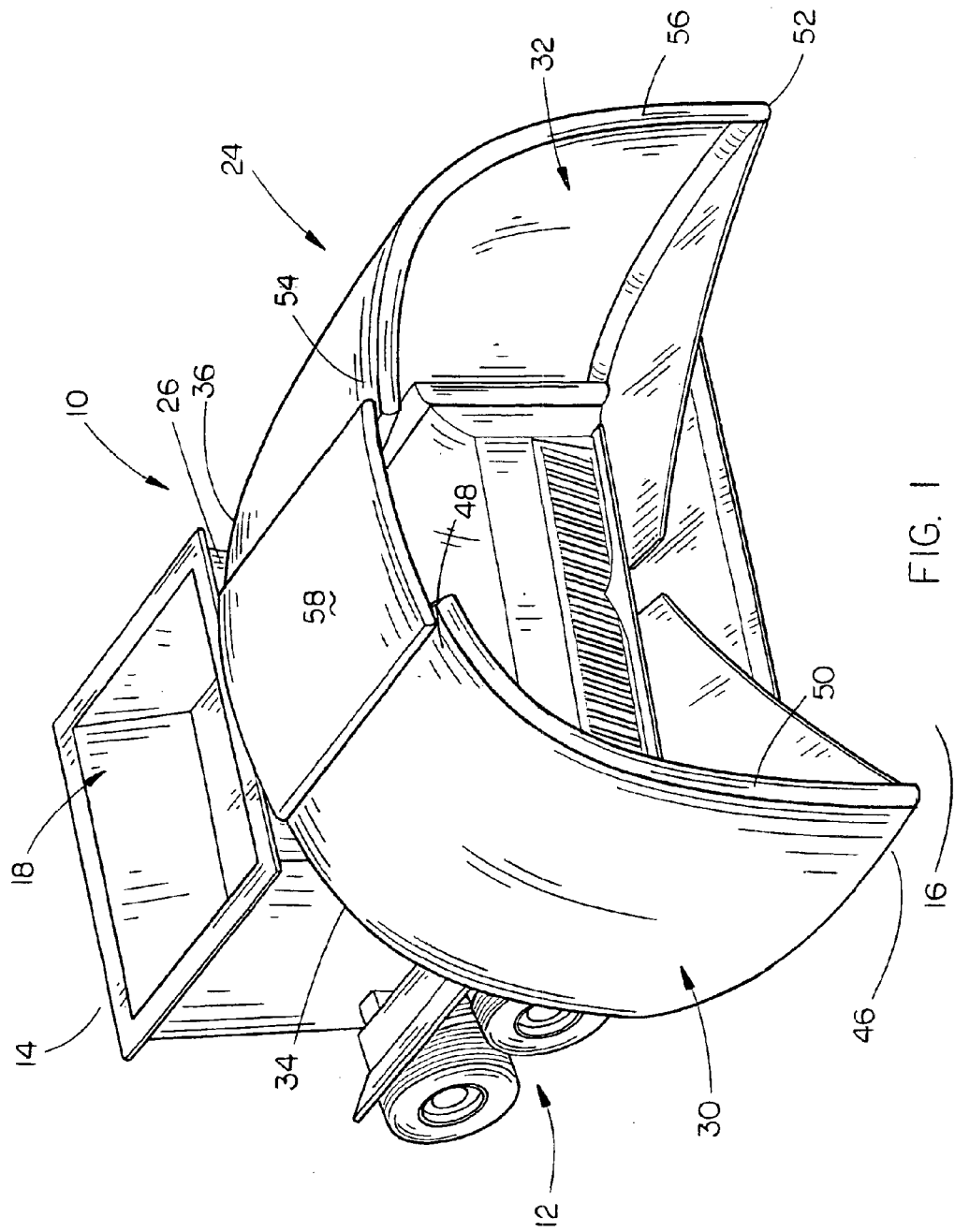
FIG. 1 is a rear perspective view of a bagging machine having the collapsible tunnel of this invention mounted thereon.

The numeral 10 refers to a bagging machine such as marketed by Versa Corporation, Astoria, Oreg. The bagging machine is intended to bag organic material such as compost, silage, grain, sawdust, etc., within a conventional bag. The machine 10 may also be used to bag dirt or sand to create temporary dikes during flooding. Machine 10 is seen to include a wheeled frame 12. Although frame 12 shown in the drawings as wheeled, it is possible that the wheels could be omitted. Further, the machine 10 could be truck-mounted such as seen in U.S. Pat. No. 5,784,865. Additionally, the machine 10 could be self-propelled such as illustrated in U.S. Pat. No. 5,799,472.

For purposes of description, machine 10 will be described as having a forward end 14 and a rearward end 16. Machine 10 is provided with material receiving means 18 at its rearward end which may be in the form of: (1) feed table such as seen in U.S. Pat. No. 5,297,377; (2) a hopper such as see in U.S. Pat. No. 5,398,736; (3) a feed mechanism such as shown in U.S. Pat. No. 5,396,753; (4) a feed mechanism such as shown in U.S. Pat. No. 5,367,860; or (5) a hopper such as seen in U.S. Pat. Nos. 5,140,802; 5,419,02; and 5,724,793. The purpose of the material receiving means is to receive the material to be bagged and deliver the same to a material packing means 20 positioned t the forward end of a material shaping or forming means. The material packing means may be: (1) a rotor such as shown in U.S. Pat. Nos. 5,396,753; 5,297,377; 5,799,472; 5,295,554; (2) a screw conveyor such as seen in U.S. Pat. Nos. 5,140,802 or 5,419,102; (3) a plunger such as seen in U.S. Pat. No. 5,724,793; or (4) he packing fingers described in U.S. Pat. No. 3,687,061.

The material forming or shaping means is preferably a tunnel 24. The size (diameter) of the tunnel 24 will depend on the desired bag diameter. A face plate 26 is normally secured to the frame of the machine. In some machines, the face plate 26 is permanently mounted on the machine with the tunnel being secured to the face plate. Various tunnels are shown in U.S. Pat. Nos. 5,899,247; 5,396,753; 5,297,377; 5,799,472; 5,398,736; 5,355,659; 5,295,554; 5,140,802; 5,419,102; 5,421,142; 5,724,793; 5,894,713. Face plate 26 normally includes an opening 28 through which the material passes to the interior of the tunnel when a rotor is utilized as the packing means. If plungers, screw conveyors, etc., are utilized as the packing means, the face plate may or may not be included and opening 28 will be omitted. The design of the material receiving means and packing means do not form a part of the instant invention.

Figure 2:
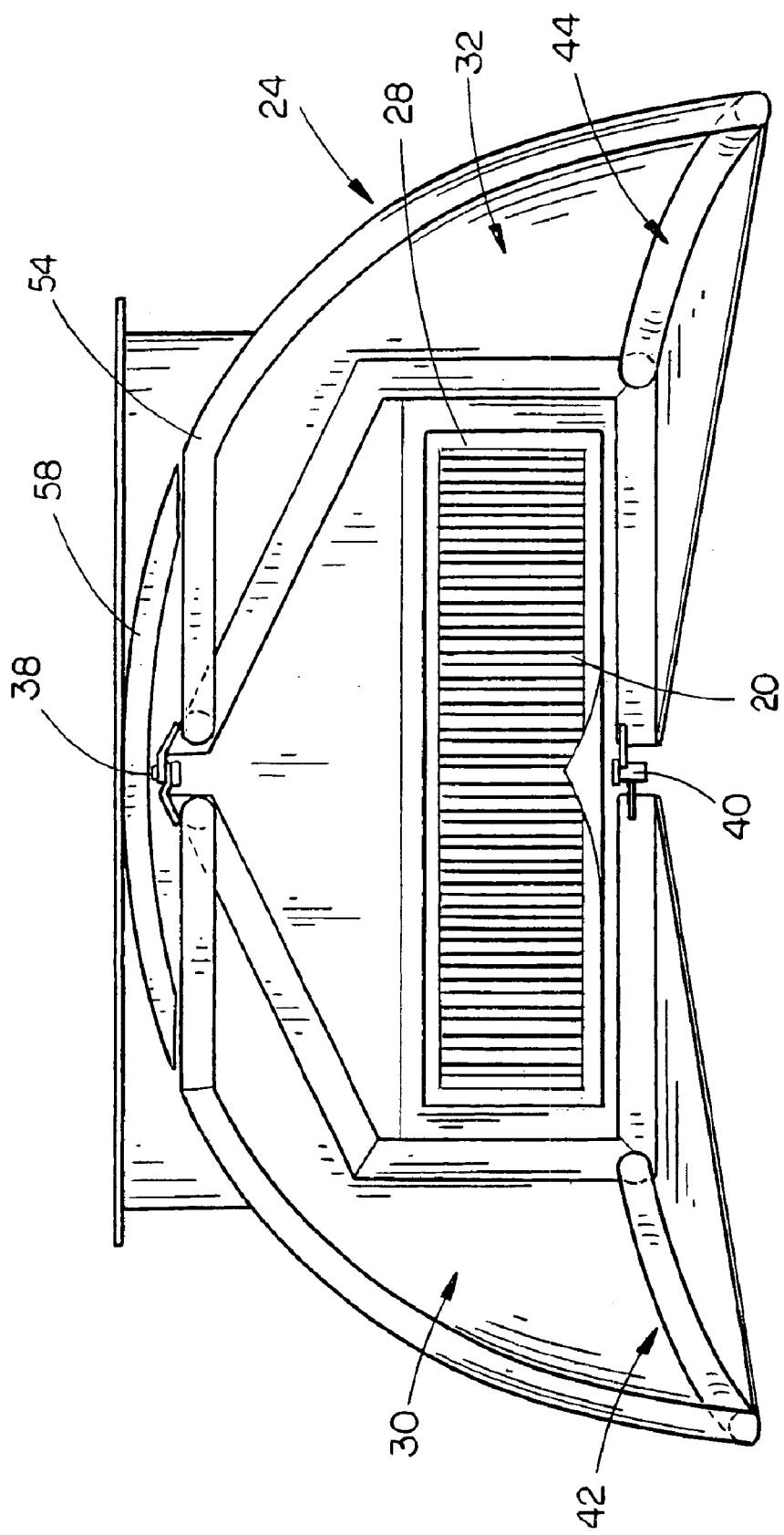
FIG. 2 is a rear view of the machine of FIG. 1.

Referring to FIGS. 1 and 2, tunnel 24 includes tunnel halves or members 30 and 32 which are hingedly connected at the inner portions of forward ends 34 and 36 by a pair of substantially vertically disposed hinges 38 and 40. Although a pair of hinges 38 and 40 are illustrated, the hinge point could be continuous or could be comprised of a plurality of hinges. Although it is preferred that the hinge point defined by hinges 38 and 40 be substantially vertically disposed, it might be possible to incline the same somewhat if so desired.

For purposes of description, tunnel half 30 will also be described as having a framework 42 having sheet metal secured thereto in conventional fashion. Similarly, tunnel half 32 will be described as including a framework 44 having conventional sheet material secured thereto. For purposes of description, tunnel half 30 will also be described as having lower end 46, upper end 48, and rearward end 50. Similarly, tunnel half 32 will be described as having a lower end 52, upper end 54 and a rearward end 56.

Figure 3:
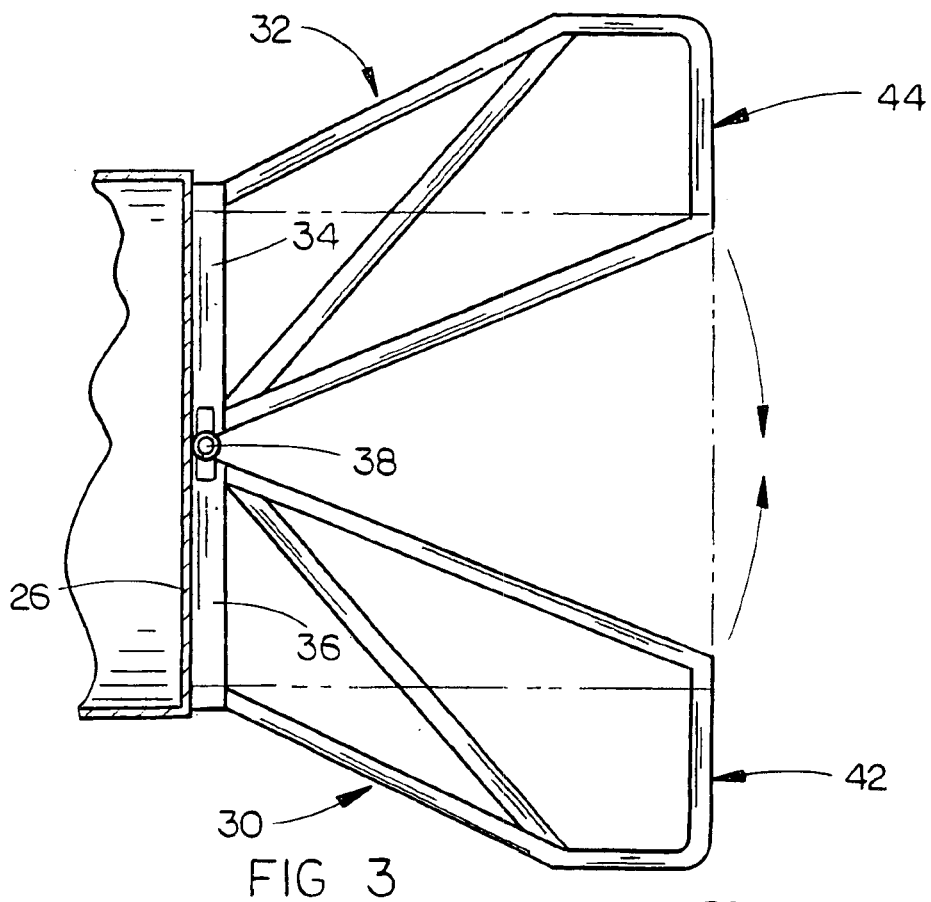
FIG. 3 is a partial top view of the machine of FIG. 1 with the tunnel in an operative position.
Figure 4:
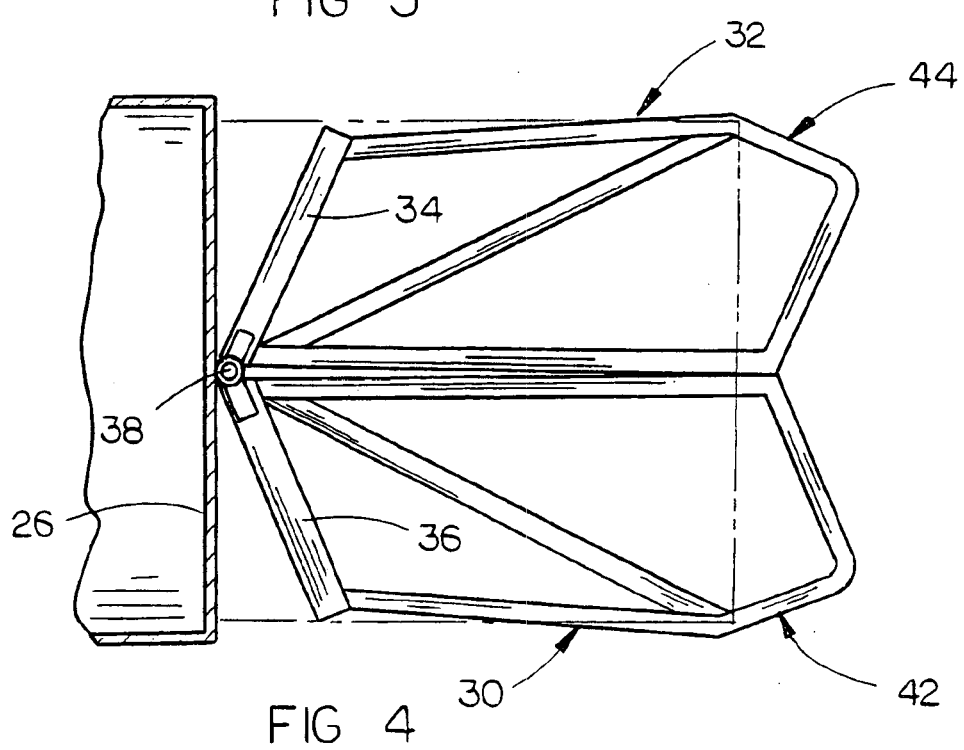
FIG. 4 is a view similar to FIG. 3 except that the tunnel is shown in its collapsed position.
Figure 5:
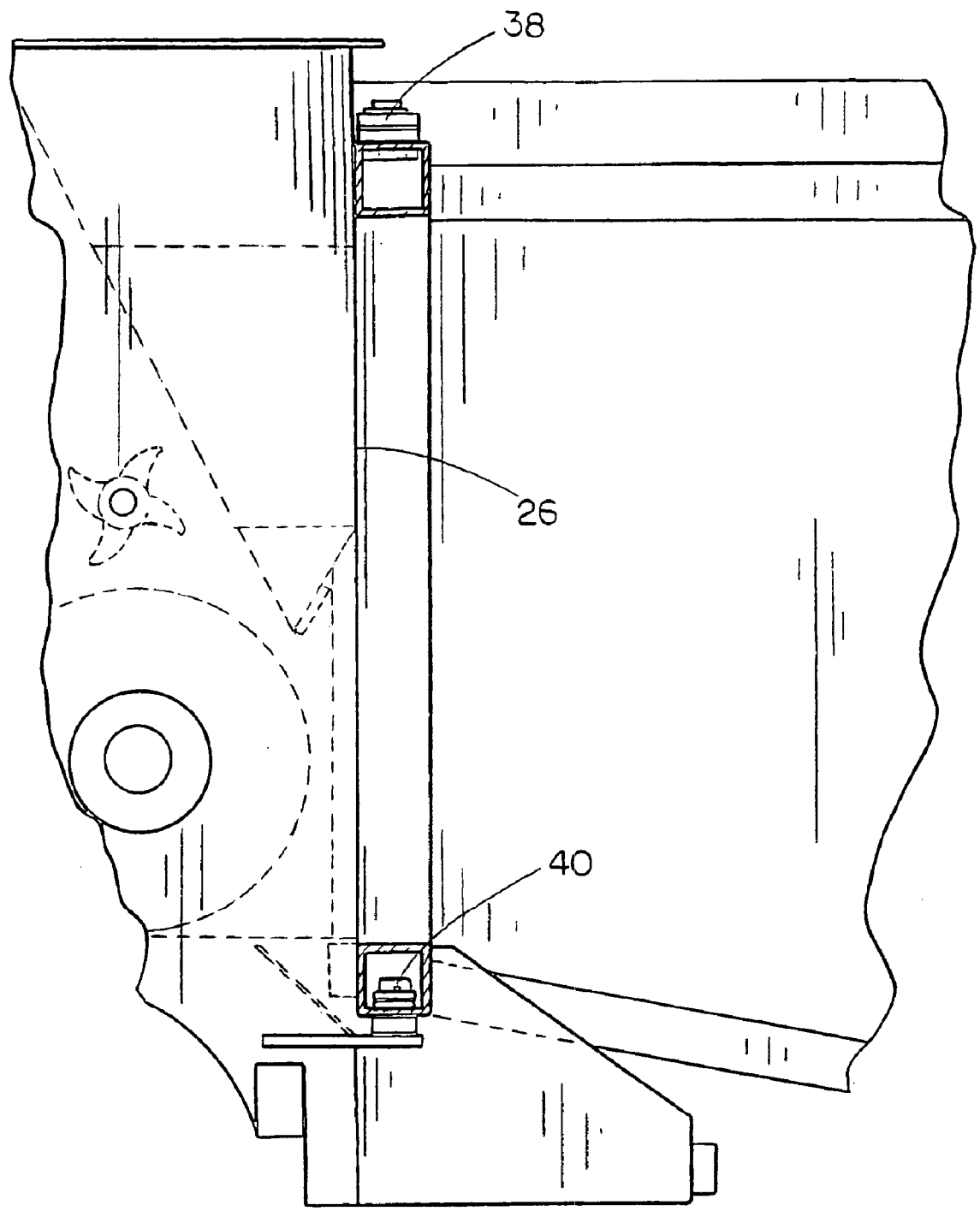
FIG. 5 is a partial sectional view illustrating the hinging of the tunnel to the machine frame.

The tunnel halves 30 and 32 are selectively pivotally or hingedly movable between the open or operative position seen in FIG. 3 to the closed position such as seen in FIG. 4. The tunnel halves 30 and 32 may be hingedly moved between their open and closed positions by any convenient means such as by a hydraulic cylinder, gear rack, etc. A shroud 58 is secured at its forward end to face plate 26 or other structure of the machine and extends rearwardly therefrom over the upper ends of the tunnel halves or members 30 and 32 to close the space therebetween when the tunnel halves or members 30 and 32 are in their operative position.

FIGS. 1–3 illustrate the tunnel 24 in its operative bagging position. When the tunnel 24 is in the operative bagging position of FIGS. 1 and 3, the forward ends 34 and 36 of tunnel halves 30 and 32 engage the rearward side of face plate 26 or the frame of the machine. The pressure of the packed material within the tunnel 24 causes the forward ends 34 and 36 of tunnel halves 30 and 32 to seal the front portion against the face plate 26 or machine frame and to structurally complement the design. When it is desired to reduce the width of the tunnel for transport, shipment or bag installation purposes, the means for pivotally or hingedly moving tunnel halves 30 and 32 is employed which draws or pulls the lower ends of the tunnel halves 30 and 32 towards one another, as seen in FIG. 4. With the tunnel 24 in its collapsed position, the width of the machine and the tunnel is well within normal road width restrictions. The collapsible feature also reduces the width of the machine for shipment. When the bagging machine has been transported to the desired location, the means for hingedly moving the tunnel halves or members 30 and 32 is actuated to again position the tunnel in its operative or open position. When the tunnel 24 is in its collapsed condition, the narrower width thereof eases the bag installation thereon.

The primary difference between the invention disclosed herein and the prior art is that a single hinge point, which is substantially vertically disposed, is provided at the forward end of the tunnel members so that the tunnel members may be pivotally moved towards one another or moved away from one another. The single hinge point between the tunnel members and the fact that the hinge point is stationary, represents a distinct improvement over the prior art. Although the collapsible tunnel in applicant's co-pending application works extremely well, in the large bagging machines which employ a crane mounted on the machine, the vertical upward movement of the tunnel members when they are moved to their collapsed position can sometimes be limited by the bag crane. In the instant invention, the hinge point between the tunnel members is stationary and does not move vertically or laterally. Further, the use of a single hinge point provides a greater amount of collapsed movement which is achieved with a minimum of parts.

Figure 6:
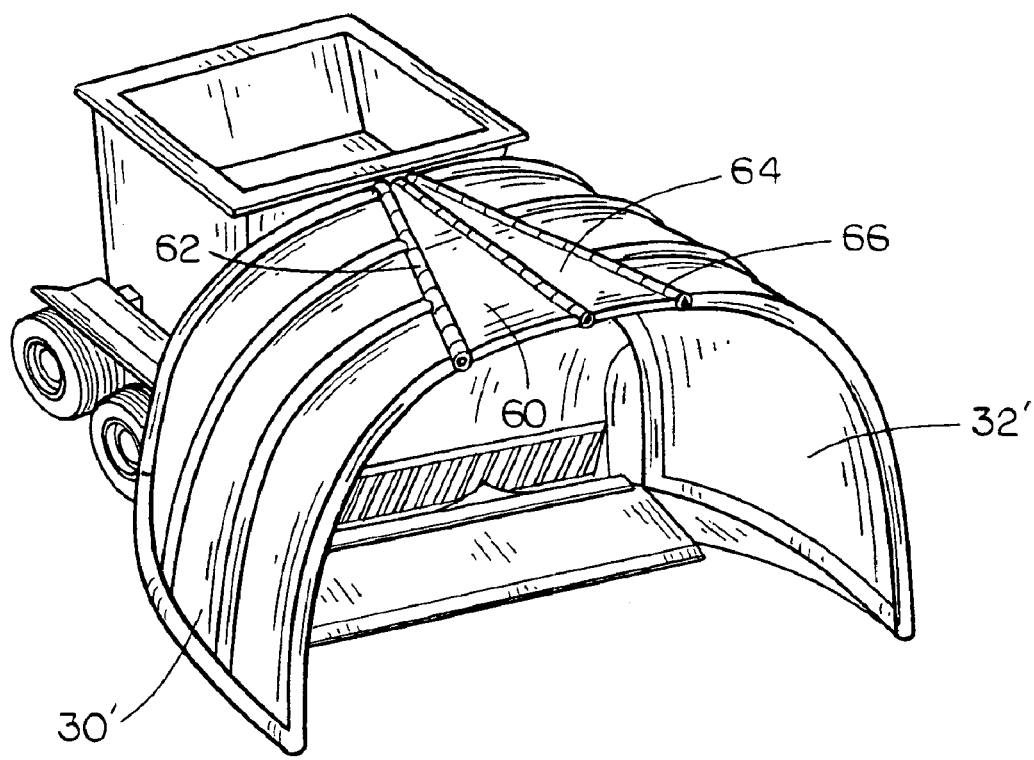
FIG. 6 is a rear perspective view of a modified means for closing the space between the upper inner ends of the tunnel halves.
Figure 7:
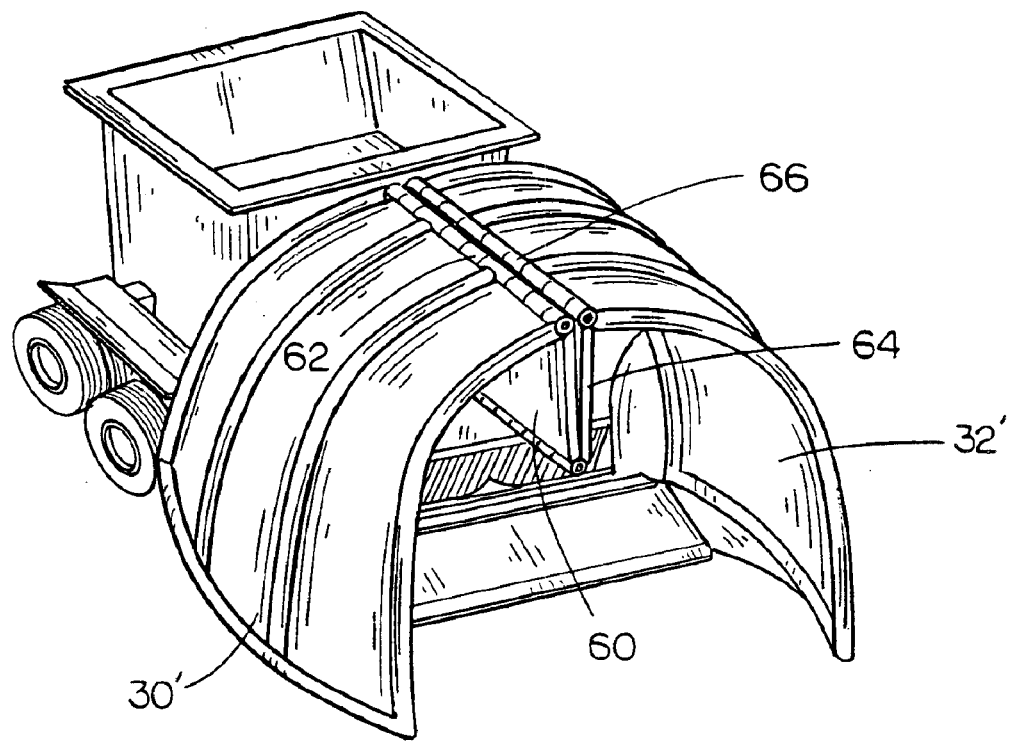
FIG. 7 is a view similar to FIG. 6 except that the tunnel is illustrated in its collapsed position.

FIGS. 6 and 7 illustrate a modification of the design which eliminates the need for the shroud 58. In FIGS. 6 and 7, the inner portion of upper end 48' of tunnel half 30' has a panel 60 secured thereto by hinge 62. The inner portion of upper end 52' of tunnel half 32' has a panel 64 secured thereto by hinge 66. The inner ends of panels 60 and 64 are hingedly connected together by hinge 66.

When the tunnel embodiment of FIGS. 6 and 7 is in the operative position of FIG. 6, the panels 60 and 64 close the space between the tunnel halves 30' and 32'. When in the collapsed position of FIG. 7, the panels 60 and 64 may be rigid or constructed of a heavy flexible belting material or fabric material. If constructed of flexible material, the panels 60 and 64 may be combined into a single panel member. The edges of the flexible panel may be secured to tunnel halves 30' and 32' in any convenient fashion.

Thus it can be seen that the invention accomplishes at least all of its stated objectives.

I claim:

1. A material bagging machine, comprising:
   a mobile frame having rearward and forward ends;
   a material receiving means on said mobile frame;
   a material packing means on said mobile frame in communication with said material receiving means;
   a rearwardly extending material forming means in communication with said material packing means;
   said material forming means including first and second forming members having rearward and forward ends, inner and outer sides; and upper and lower ends;
   said inner sides of said first and second forming members being operatively hingedly connected to said mobile frame at their forward ends;
   said first and second forming members being selectively movable between operative and reduced width positions so that the distance between said lower outer ends of said first and second forming members may be selectively reduced when said first and second forming members are moved from their operative positions to their reduced width positions;
   said first and second forming members being hingedly connected together at their said forward ends.

2. The machine of claim 1 wherein the hinge connection between said first and second forming members is substantially vertically disposed.

3. The machine of claim 1 wherein the hinge connection between said first and second forming members comprises at least upper and lower hinges.

4. The machine of claim 3 wherein said upper hinge is positioned substantially directly above said lower hinge.

5. The machine of claim 1 wherein a shroud member extends over said upper ends of said first and second forming members.

6. The machine of claim 1 further including a substantially vertically disposed face plate and wherein said first and second forming members are hingedly secured to said face plate.

7. The machine of claim 6 wherein said forward ends of said first and second forming members engage said face plate when said first and second forming members are in their said operative position.

8. The machine of claim 1 wherein said mobile frame has a substantially vertically disposed wall positioned forwardly of said first and second forming members and wherein said forward ends of said first and second forming members engage said wall when in their said operative position.

9. The machine of claim 1 wherein a foldable panel extends between said upper ends of said first and second forming members.

10. The machine of claim 9 wherein said panel is flexible.

11. The machine of claim 9 wherein said panel is hingedly secured to said tunnel halves.

12. The machine of claim 11 wherein said panel comprises at least a pair of panel members hingedly secured together.

13. The machine of claim 1 wherein a closure extends between said upper ends of said first and second forming members.

14. A material bagging machine, comprising:
   a mobile frame having rearward and forward ends;
   a material receiving means on said mobile frame;
   a material packing means on said mobile frame in communication with said material receiving means;
   a rearwardly extending material forming means in communication with said material packing means;
   said material forming means including first and second forming members having rearward and forward ends, inner and outer sides; and upper and lower ends;
   said first and second forming members being operatively hingedly connected to said mobile frame at their forward ends;
   each of said first and second forming members being hingedly connected to said mobile frame about substantially vertical axes;
   said first and second forming members being selectively movable between operative and reduced width positions so that the distance between said lower outer ends of said first and second forming members may be selectively reduced when said first and second forming members are moved from their operative positions to their reduced width positions.

* * * * *